Sept. 30, 1958 G. E. AMMERMAN 2,854,559
ELECTRIC HEATING DEVICE
Filed Aug. 4, 1955
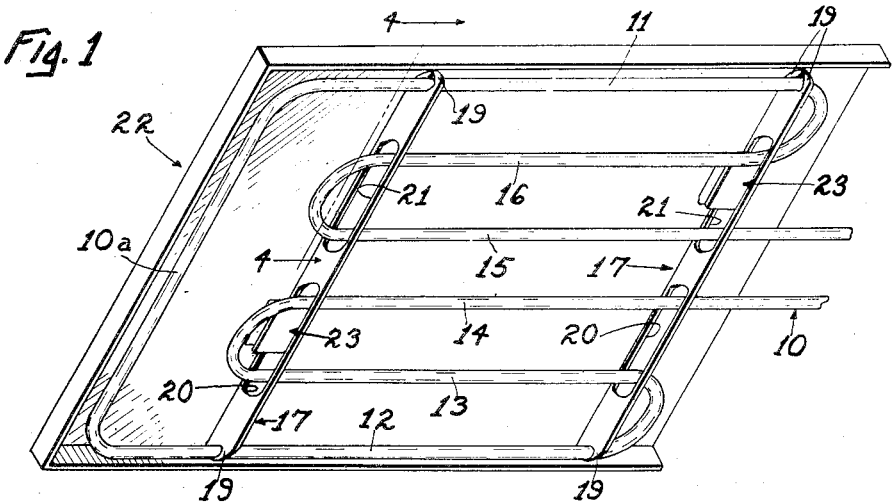
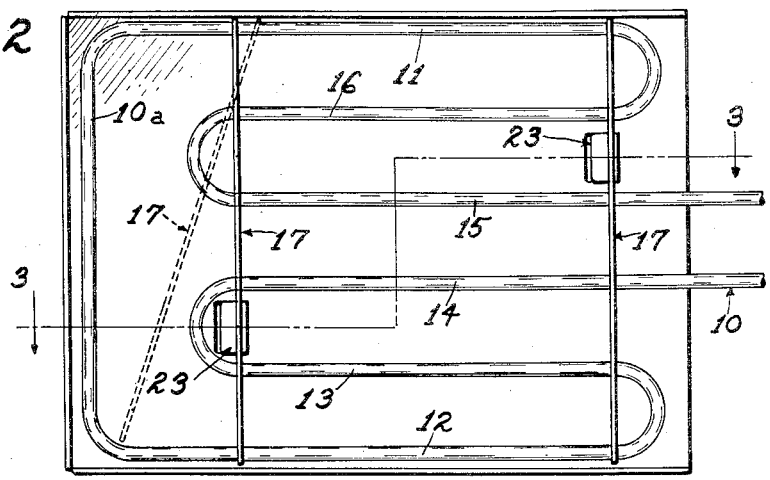
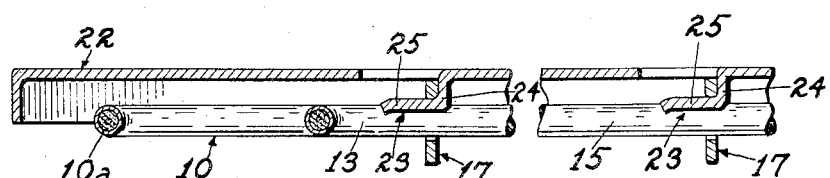
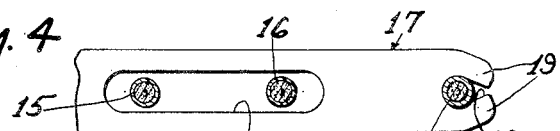
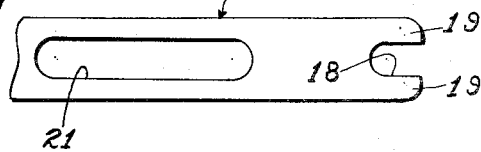
INVENTOR.
G. EDWARD AMMERMAN
BY
*Michael Williams*
ATTORNEY

United States Patent Office 2,854,559
Patented Sept. 30, 1958

2,854,559

ELECTRIC HEATING DEVICE

George Edward Ammerman, Oakmont, Pa., assignor to Edwin L. Wiegand Company, Pittsburgh, Pa., a corporation of Pennsylvania Application August 4, 1955, Serial No. 526,391

11 Claims. (Cl. 219—37)

The present invention relates to electric heating devices, more particularly to electric heating devices of the type adapted to be employed as broiler or baking units in electric ranges, and the principal object of the invention is to provide new and improved devices of the character described.

Most domestic electric ranges, in addition to having top surface heating elements, have an oven which usually has a baking element at the bottom and a broiler element at the top. It is desirable, particularly with broiler elements, to provide a deflector adjacent the element which will reflect the heat radiated thereby and/or which will serve as a shield to at least partially protect the interior of the oven against spattering.

Prior art broiler elements have employed deflectors of various types; however, most of these constructions have been expensive to manufacture, difficult to disassemble for cleaning, and were relatively inefficient because the deflector was not positioned sufficiently close to the heating element.

The present invention, although particularly adapted for use with sheathed types of heating elements, is also adapted to be used with the well-known, open coil types of element. The many advantages of the present invention will readily become apparent from a study of the following description and from the drawings appended hereto.

In the drawings accompanying this specification and forming a part of this application, there is shown, for purpose of illustration, an embodiment which the invention may assume, and in these drawings:

Figure 1 is a perspective view of an electric heating device constructed in accordance with the present invention and illustrating a preferred embodiment, Figure 2 is a plan view of the embodiment shown in Figure 1, Figure 3 is an enlarged, broken sectional view generally corresponding to the line 3—3 of Figure 2, Figure 4 is an enlarged fragmentary view generally corresponding to the line 4—4 of Figure 1, and Figure 5 is a view similar to Figure 4 but illustrating a detail prior to final assembly of the device.

The heating element of the present invention is of the well-known type wherein a resistor conductor is encased in a tubular metallic sheath filled with a suitable compacted granular material which embeds the resistor conductor. This type of element is superior to the open coil type since its normal life expectancy is many times that of the open coil; moreover, a sheathed type element is normally sufficiently rigid so that it requires little or no bracing whereas the open coil type requires a relatively elaborate supporting structure. In the presently disclosed embodiment, and as shown in Figures 1 and 2, an elongated, sheathed heating element 10 is convoluted to provide a plurality of spaced legs disposed in side-by-side relation. The configuration of the present heater provides outer legs 11, 12, joined together by a transverse leg 10a, and intermediate legs 13, 14, 15 and 16.

In the position of parts shown, legs 14, 15 extend to the right beyond the convolutions provided by the interconnected legs 11, 16 and 12, 13 and the right-hand end of legs 14, 15 may terminate in any suitable construction (not shown) which provides for making the necessary electrical connections to the element and which may also support the element in its normal use position.

In order to add rigidity to the element, spaced struts 17 (herein shown to be two in number) extend transversely of the element legs and are affixed to certain of such legs to provide a unitary, grid-like assembly therewith. In the present embodiment, each strut 17 comprises a metal strip having its ends notched at 18 (see Figure 5) to provide spaced legs 19 for respectively receiving therebetween outer legs 11, 12 of the heating element. The intermediate portion of each strut 17 is further provided with slots 20, 21 (see Figure 1) for a purpose to appear.

With the struts 17 formed in the manner herein disclosed, their assembly with the element 10 may be as follows: Each strut may be positioned adjacent transverse leg 10a and so tilted (see the dot-dash line position shown in Figure 2) that it fits between outer legs 11, 12 of the element. Each strut will then be shifted to the right (the legs 19 provided by the respective notches 18 of the struts straddling respective adjoining outer element legs 11, 12) to aproximately the positions shown and then secured in place in a manner to be disclosed. Note that slots 21 of the struts provide clearance for passing legs 15, 16 of the element whereas slots 20 provide clearance for passing legs 13, 14. At the present time, struts 17 are secured in place by bending the free ends of adjoining legs 19 toward each other to partially encircle and tightly clamp about the respective element leg positioned therebetween (see Figure 4).

The present device is particularly adapted for use as a broiler unit; accordingly, the about to be described deflector is positioned above the heating element so as to reflect the heat radiated by the element downwardly and to prevent spattering of grease and the like on the ceiling of the oven. It will be appreciated, however, that heating units of the type herein disclosed could also be employed as baking units which are normally positioned at the bottom of the oven chamber. In the latter event, it will be clear that the deflector could, if desired, be positioned beneath the heating element so as to reflect the radiated heat upwardly.

The present invention employs a deflector 22 which, as herein shown, comprises a flat plate generally coextensive with the convolutions of the heating element and attached thereto but easily removable to facilitate cleaning. In order to increase the rigidity of the deflector, three sides thereof are bent downwardly as shown; however, this may not be necessary in the event the deflector is made of sufficiently heavy stock. Moreover, although the present deflector is shown to be flat, it may be fluted, ribbed, curved or otherwise formed to increase its rigidity and/or to direct radiation from the heating element.

In the present construction, deflector 22 has a pair of tabs 23 struck therefrom (see Figures 1, 2 and 3), each tab being bent downwardly to provide a vertical leg 24 and outwardly to provide a horizontal leg 25. Each horizontal tab leg 25 is adapted to pass through one of the slots in struts 17, one tab leg 25 passing through slot 21 of one of the struts and the other tab leg 25 passing through slot 20 of the other strut. As seen in Figure 3, the spacing between the under surface of the deflector 22 and the upper surface of tab legs 25 is such that the portions of the respective struts 17 adjacent the latters' respective slots 20, 21 will be closely receivable therebetween to maintain the deflector and heating element in assembled relation. If desired, the free ends of tab legs 25 may be curved downwardly, as illustrated, to facilitate attaching the deflector to the heater.

Disassembly of the deflector 22 from the heater for cleaning or other purposes is effected by simply shifting the deflector to the right (in the position of parts shown) until tabs 23 disengage from struts 17. Reversal of this procedure will effect re-assembly of the heater and the deflector.

As illustrated in the drawings, the present invention provides for positioning the deflector 22 close to the heating element. This not only provides the advantage of reducing the vertical space (in the position of parts shown) required for the assembly but also makes it possible to use a deflector which extends over little more than the span of the element without reducing the effectiveness of the deflector. It will readily be apparent that the further the deflector is positioned from the element, the greater will its span have to be in order to efficiently intercept the heat radiated by the element and/or to intercept the spattering which occurs during cooking.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. In an electric heating device, the combination comprising an elongated sheathed embedded resistor type heating element convoluted to provide at least three leg portions in side-by-side spaced-apart relation, a strut extending transversely between said element leg portions for maintaining them in predetermined relation, said strut having terminal portions respectively affixed to the sheaths of the outermost leg portions and having an intermediate portion apertured to pass the intermediate leg portions, and deflector means detachably secured to said strut and in a position adjacent said heating element.

2. In an electric heating device, the combination comprising an elongated sheathed embedded resistor type heating element convoluted to provide at least three leg portions in side-by-side spaced-apart relation, a strut extending transversely between said element leg portions for maintaining them in predetermined relation, said strut having terminal portions respectively affixed to the sheaths of the outermost leg portions and having an intermediate portion apertured to pass the intermediate of said leg portions, and deflector means positioned adjacent said heating element for reflecting the heat radiated thereby, said deflector means having clips engageable with the apertured intermediate portion of said strut for detachably securing said deflector means thereto.

3. In an electric heating device, the combination comprising an elongated sheathed embedded resistor type heating element convoluted to provide at least three leg portions in side-by-side spaced-apart relation, a strut extending transversely between said element leg portions for maintaining them in predetermined relation, said strut having terminal portions respectively affixed to the sheaths of the outermost leg portions and having an intermediate portion apertured to pass the intermediate of said leg portions, and deflector means positioned adjacent said heating element for reflecting the heat radiated thereby, said deflector means having a tongue adapted to pass through the aperture in said strut for detachably securing said deflector means thereto.

4. In an electric heating device, the combination comprising an elongated sheathed embedded resistor type heating element convoluted to provide at least three leg portions disposed in generally the same plane and in side-by-side spaced-apart relation, a strut extending transversely between said element leg portions for maintaining them in predetermined relation, said strut having terminal portions providing spaced legs at each end which straddle respective outermost element leg portions and said strut having an intermediate portion apertured to pass the intermediate element leg portions, the adjoining spaced legs of said strut being bent toward each other and at least partially encircling a respective element leg portion to secure said strut in position, and a generally flat deflector positioned adjacent said heating element and generally coextensive therewith for reflecting the heat radiated thereby, said deflector having a tongue adapted to pass through the aperture in said strut for detachably securing said deflector thereto.

5. An electric heating device, comprising an elongated sheathed heating element shaped to provide spaced leg portions generally disposed in a common plane, a sheet metal strip-like strut having end recesses and an intermediate recess, said strut extending cross-wise of said leg portions with at least certain of the latter seating within respective end recesses of said strut, and a reflector plate overlying said heating element and said strut, said reflector plate having a laterally extending hook member which passes through said intermediate recess and resiliently bears against a marginal surface thereof to draw said plate against an oppositely facing surface of said strut.

6. The structure of claim 5 wherein portions of the strut margining said end recesses are bent over the leg portions of said heating element to lock the latter in assembled relation with said strut.

7. An electric heating device, comprising an elongated sheathed heating element shaped to looped formation to provide spaced outermost and intermediate leg portions all generally disposed in a common plane, a sheet metal strip-like strut having end recesses and an intermediate recess, said strut extending cross-wise of said leg portions with the outermost leg portions seating within respective end recesses of said strut and the intermediate of said leg portions extending through said intermediate recess, a reflector plate overlying said heating element and said strut and having a portion engaging a marginal surface of said intermediate recess to detachably hold said reflector plate in assembled relation with said strut.

8. An electric heating device, comprising an elongated sheathed heating element shaped to looped formation to provide spaced outermost and intermediate leg portions all generally disposed in a common plane, a sheet metal strip-like strut having end recesses and an intermediate recess, said strut extending cross-wise of said leg portions with the outermost leg portions seating within respective end recesses of said strut and the intermediate of said leg portions extending through said intermediate recess, a reflector plate overlying said heating element and said strut, said reflector plate having a laterally extending hook member which passes through said intermediate recess and resiliently bears against a marginal surface thereof to drain said plate against an oppositely facing surface of said strut.

9. The structure of claim 8 wherein portions of the strut margining said end recesses are bent over the leg portions of said heating element to lock the latter in assembled relation with said strut.

10. In an electric heater for oven enclosures, the combination comprising a sheathed embedded resistor type heating element extending longitudinally from front to rear of the oven and providing a pair of longitudinally spaced, transversely extending portions, a deflector adjacent said element and at least partially coextensive therewith, and a pair of clips carried by said deflector for slidable engagement with respective transversely extending element portions for detachably securing respective ends of said deflector to said element.

11. In an electric heater for oven enclosures, the combination comprising a sheathed embedded resistor type heating element extending longitudinally from front to rear of the oven and having a pair of longitudinally extending, transversely spaced leg portions, a pair of longitudinally spaced, transversely extending struts secured to and connecting said element leg portions together, a deflector adjacent said element and at least partially coextensive therewith, and a pair of clips carried by said deflector for slidable engagement with respective struts for detachably securing respective ends of said deflector to said element.

References Cited in the file of this patent

UNITED STATES PATENTS

| | | |
|---|---|---|
| 2,408,295 | Cossin | Sept. 24, 1946 |
| 2,498,583 | Schulze | Feb. 21, 1950 |
| 2,722,591 | Fry | Nov. 1, 1955 |